United States Patent [19]

Seto et al.

[11] 4,364,658

[45] Dec. 21, 1982

[54] SCANNING ILLUMINATOR

[75] Inventors: Susumu Seto, Odawara; Mitsuhiro Tokuhara, Chigasaki; Yukio Takemura, Kawasaki; Yu Yamada, Kokubunji; Takeshi Kuwayama, Yokohama, all of Japan

[73] Assignee: Canon Kabushiki Kaisha, Tokyo, Japan

[21] Appl. No.: 282,914

[22] Filed: Jul. 13, 1981

[30] Foreign Application Priority Data

Jul. 25, 1980 [JP] Japan ................... 55-102583

[51] Int. Cl.³ .......................................... G03G 15/28
[52] U.S. Cl. ........................................... 355/8; 355/70
[58] Field of Search ............... 355/50, 51, 8, 70, 11

[56] References Cited

U.S. PATENT DOCUMENTS

| 3,600,088 | 8/1971 | Joel | 355/51 |
| 4,189,763 | 2/1980 | Suzuki et al. | 355/11 |
| 4,232,964 | 11/1980 | Nodov et al. | 355/70 |

FOREIGN PATENT DOCUMENTS 55-67764 5/1980 Japan ................... 355/8

Primary Examiner—Monroe H. Hayes
Attorney, Agent, or Firm—Fitzpatrick, Cella, Harper & Scinto

[57] ABSTRACT

A scanning illuminator has a compact structure suitable for use in high speed copying machines and is adapted to reflect light beams from two light sources fixed adjacent to the opposite ends of an original supporting area to the surface of an original by means of rotary mirrors and translating mirrors for illuminating the original surface in a slit shape. The scanning illuminator has a flexibility in optical adjustment.

7 Claims, 2 Drawing Figures

SCANNING ILLUMINATOR

BACKGROUND OF THE INVENTION

1. Field of the Invention

This invention relates to a scanning illuminator suitable for use in high speed copying machines.

2. Description of the Prior Art

In the prior art slit-exposure type copying machines, it is known that two sources of light are symmetrically disposed adjacent to the opposite end of an original supporting area, the light beams from the respective light sources being progressively reflected toward the surface of an original to be copied for scanning it in a slit-exposure manner. However, it is also known that they have disadvantages in that the incident angle at the opposite end of the original is increased to reduce the illumination efficiency and that the rotary mirrors do not deal with any wrong positioning of optical systems and any deviation of light sources out of given positions. In other words, the prior art slit-exposure type copying machines have no flexibility. If a source of light is positioned at a wrong location, for example, upon exchanging, the light beam therefrom would be changed in incident-angle to the rotary mirror so as to deviate the scanned area on the surface of the original.

SUMMARY OF THE INVENTION

It is an object of this invention to provide a scanning illuminator having a compact structure which can be operated with a minimum stroke and which can establish a desired incident angle even at the end of an original to be copied and improve an illumination efficiency while providing a flexibility in positioning optical systems.

DESCRIPTION OF THE PREFERRED EMBODIMENTS

Figure 1:
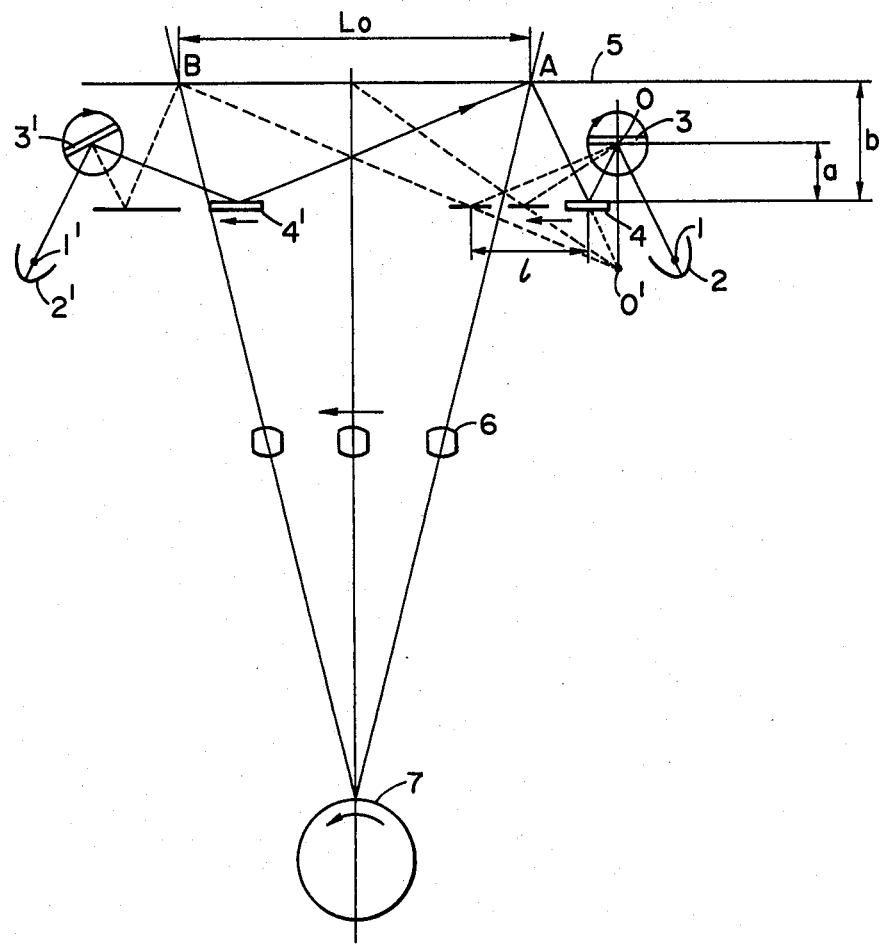
FIG. 1 is a schematic view showing an embodiment of this invention.

In FIG. 1, a scanning illuminator comprises a pair of illuminating systems disposed symmetrically adjacent to the opposite ends of an original supporting area. In one of the illuminating systems, light from a source of light 1 is reflected by a reflector 2 to a rotary mirror 3 which is rotated in an arrow direction, or transmitted directly to the rotational center O of the rotary mirror 3. At the rotary mirror 3, the light is again reflected to a translating mirror 4 which is moved parallel to the surface of an original 5 in an arrow direction. The light is further reflected by the translating mirror 5 to progressively illuminate the original surface 5 in a slit shape. In the opposite illuminating system, similarly, light is transmitted from a source of light 1' to a translating mirror 4' through a reflector 2' and rotary mirror 3' or only through the rotary mirror 3' for progressively illuminating the same slit-shaped area on the original 5 as illuminated by the light source 1. The so illuminated slit-shape area of the original 5 is projected progressively onto a rotating photoreceptor 7 in a slit shape through a projection lens 6 which is moved parallel to the original surface 5 in an arrow direction.

If the light source 1 is displaced out of its normal position, the incident angle would be changed at the reflecting point O on the rotary mirror 3. Thus, the starting point in the original illuminated area would be deviated. However, this is compensated by adjusting the angle in the translating mirror 4. For the same purpose, the other translating mirror 4' can be also adjusted in the same manner. The so adjusted translating mirrors 4 and 4' are moved parallel to the original surface 5 with the desired angle relative to the same surface 5.

Figure 2:
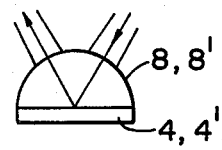
FIG. 2 is a view showing a modification utilizing a translating mirror which has a convergency.

Now, this invention provides two translating mirrors 4 and 4' which enable the illuminating light beam to have a convergency. As shown in FIG. 2, positive lenses 8 and 8' can be mounted respectively on the translating mirrors 4 and 4' to form a so-called in-mirror lens system for providing a convergency in each of the illuminating beams from the light sources. It is especially preferred that each of the positive lenses 8 and 8' is of a cylindrical shape which is divided half from a spherical lens.

The movement stroke in each of the translating mirrors 4 and 4' will now be described. In FIG. 1 arrangement wherein an image of the rotational center O of the rotary mirror 3 formed by means of the translating mirror 4 is indicated by O', it appears that the scanning light beam is just emitted from the point O'. Supposing that a distance between the rotational center O and the translating mirror 4 is represented by a letter a, a distance between the translating mirror 4 and the surface of the original 5 by b, a scan stroke on the original 5 by Lo, and a movement stroke of the translating mirror 4 by l, the following formula can be obtained:

$$l/Lo = a/(a+b)$$

therefrom, $$l = \frac{Lo}{1 + \frac{b}{a}}$$

when a:b is now 1:2, l is (Lo/3).

In general, if the translating mirror 4 is positioned closer to the rotational center O of the rotary mirror 3 than the original surface 5, the movement stroke of the translating mirror 4 can be decreased.

It is generally desirable that the photoreceptor 7 is rotated at a constant speed for the desired process. Thus, the scan speed in the original surface 5 is also required to be constant. When the rotary mirror 3 is rotated at a uniform angular velocity, however, the scan speed of the illuminating light beam for the original surface 5 does not become uniform. In order to scan the original surface 5 at a uniform speed, it is conversely required to rotate the rotary mirror 3 at a non-uniform velocity. This can be accomplished by utilizing, for example, a principle of the galvano-mirror.

Even if central rays in the illuminating beam are not uniform in scan speed, the whole scan speed can be held uniform by illuminating the slit-shaped area of the original over some wider range with the given rays in the illuminating light beam. Furthermore, if the reflectors 2 and 2' are, for example, in the form of a mirror having an oval cross-section, the light sources 1 and 1' are positioned at the respective first focal points of these mirrors, and the opposite ends of the original 5 are located at the corresponding second focal points A and B turned at the respective mirrors 3 and 4, a distribution of illumination on the original 5 is upward curved at the end areas of the scan direction than the central zone thereof so that a loss in light quantity due to the so-called $Cos^4$ law in the imaging lens 6 can be compensated by the above arrangement.

If the optical path length from the light source 1 to the illuminated slit-shape area of the original surface 5 is not changed in the illustrated embodiment, the optical path would be turned perpendicularly to the original surface 5 by means of the rotary mirror 3 and the translating mirror 4 so that the apparatus will have a more compact structure than the prior art.

Furthermore, each of the rotary mirrors 3 and 3' may be replaced by a prism mirror having its rotational center on which an illuminating light beam is incident. Still further, the position of each light source may be freely changed if the desired relative position between the corresponding rotary and translating mirrors can be maintained.

Thus, this invention provides a scanning illuminator having a more compact structure which is suitable for use in high speed copying machines.

What we claim is:

1. A scanning illuminator comprising:
   a first source of light fixed adjacent to one end of an original to be copied;
   a first rotary mirror pivotable around a reflective point for reflecting the incident light from said first light source;
   a first translating mirror for receiving the light beam from said first rotary mirror, said first translating mirror being moved substantially parallel to the original in synchronism with said first rotary mirror for illuminating said original in a slit-shape;
   a second source of light fixed adjacent to the opposite end of said original;
   a second rotary mirror pivotable around a reflective point for reflecting the incident light thereon from said second light source; and
   a second translating mirror for receiving the light beam from said second rotary mirror, said second translating mirror being moved substantially parallel to said original in synchronism with said second rotary mirror for similarly illuminating the same slit-shaped area on said original as has been illuminated by the light beam from said first translating mirror.

2. A scanning illuminator as defined in claim 1 further including first and second mirrors disposed respectively behind said first and second light sources, each of said mirrors being defined by a curve of secondary degree for converging the corresponding light beam.

3. A scanning illuminator as defined in claim 2 wherein each of said mirrors being defined by a curve of secondary degree is a cylindrical mirror of oval cross-section, and each of said first and second light sources is positioned at the first focal line of such a mirror.

4. A scanning illuminator as defined in claim 3 wherein the second focal line of each of said cylindrical mirrors is established adjacent to the corresponding end of said original.

5. A scanning illuminator as defined in claim 1 wherein each of said first and second translating mirrors is in the form of a light-converging mirror.

6. A scanning illuminator as defined in claim 5 wherein each of said first and second translating mirrors is in the form of an in-mirror lens type mirror.

7. A copying machine comprising:
   a fixed platen for originals;
   a movable photoreceptor;
   an imaging lens for imaging a slit-shaped area of an original onto said photoreceptor in a slit-shape, said imaging lens being moved parallel to the surface of said original;
   a first source of light fixed adjacent to one end of said original;
   a first rotary mirror pivotable around a reflective point for reflecting the incident light from said first light source;
   a first translating mirror receiving the light beam from said first rotary mirror, said first translating mirror being moved substantially parallel to the surface of said original in synchronism with said first rotary mirror for illuminating said original in a slit-shape;
   a second source of light fixed adjacent to the opposite end of said original;
   a second rotary mirror pivotable around a reflective point for reflecting the incident light from said second light source; and
   a second translating mirror receiving the light beam from said second rotary mirror, said second translating mirror being moved substantially parallel to the surface of said original in synchronism with said second rotary mirror for similarly illuminating the same slit-shaped area on said original as has been illuminated by the light beam from said first translating mirror.

* * * * *